(12) United States Patent
Visser

(10) Patent No.: US 7,646,309 B2
(45) Date of Patent: Jan. 12, 2010

(54) METHOD AND DEVICE FOR MONITORING ROOF LOADS

(76) Inventor: Hermanus Johannes Visser, Bus en Dam 5, NL-1566 NZ Assendelft (NL)

( * ) Notice: Subject to any disclaimer, the term of this patent is extended or adjusted under 35 U.S.C. 154(b) by 365 days.

(21) Appl. No.: 11/649,833

(22) Filed: Jan. 5, 2007

(65) Prior Publication Data

US 2007/0164874 A1    Jul. 19, 2007

(30) Foreign Application Priority Data

Jan. 6, 2006    (NL) .................................... 1030866
Mar. 7, 2006   (NL) .................................... 1031321

(51) Int. Cl.
*G08B 21/00* (2006.01)
(52) U.S. Cl. .................................... 340/686.1
(58) Field of Classification Search ............. 340/686.1, 340/510, 666, 556; 250/224
See application file for complete search history.

(56) References Cited

U.S. PATENT DOCUMENTS 4,843,372 A * 6/1989 Savino ........................ 340/540
4,927,232 A * 5/1990 Griffiths ...................... 385/13
4,936,060 A * 6/1990 Gelinas et al. .................. 52/1
5,850,185 A * 12/1998 Canty ...................... 340/686.1
6,957,166 B1 * 10/2005 Howie et al. ................ 702/173

FOREIGN PATENT DOCUMENTS

CA    1 099 366    4/1981
WO   WO 81/03698   12/1981

* cited by examiner

*Primary Examiner*—Phung Nguyen
(74) *Attorney, Agent, or Firm*—Young & Thompson

(57) ABSTRACT

A method for monitoring the load which is exerted on a roof includes the following steps:
  providing a roof with an external surface on which a load can be exerted by, for example, a layer of water or snow,
  providing a sensor for detecting a phenomenon related to the load which is exerted on the roof,
  monitoring the phenomenon with the sensor,
  storing at least one predetermined value for the phenomenon,
  emitting a signal when the value for the phenomenon detected by the sensor exceeds a predetermined value.

22 Claims, 4 Drawing Sheets

METHOD AND DEVICE FOR MONITORING ROOF LOADS

BACKGROUND OF THE INVENTION

The invention relates to the field of monitoring the loads which occur in roofs, in particular in flat or more or less flat roofs. As is known, such roofs may be subjected to highly variable loads, in particular during rainfall and snowfall. In case of rain, the load on a roof may rise to extremely high unpredictable values, for example due to the drains becoming blocked. However, high loads may also occur with snow, as the snow blanket can become quite thick with continuous snowfall. Although such loads are taken into consideration during the design of the roof, experience has repeatedly shown that flat roofs in particular are ultimately not able to withstand the extreme conditions which may occur in the abovementioned cases.

As large numbers of people may be present in the respective buildings, such loads are a great risk. Examples of such buildings which may be mentioned are swimming pools, furniture stores, schools and the like. The collapse of the roof of such public buildings may therefore have serious consequences. For this reason, risk assessments are being carried out on an increasing number of buildings, during which the susceptibility of the roof to overload is established. As a rule, such assessments result in the respective buildings having to be modified, such as by the installation of emergency overflow systems for a reliable discharge of precipitation and the like.

However, until now none of these measures have resulted in a reliable reduction in the risk. By way of example, the provision of emergency overflow systems is mentioned, which, in practice, have been found to provide only a partial solution. Although such systems are able to drain large amounts of water in a reliable manner, they do not offer a solution for small leaks which result in the accumulation of increasing amounts of water in the roof insulation. As soon as the roof insulation is saturated, the total weight of the accumulated water, and thus the load on the roof, may become so great that the risk of collapse still emerges.

Snowfall causes even greater problems, as snow cannot be easily removed. In addition, there is the added risk of snow which has partially melted freezing, thus blocking the drains with ice. During a subsequent thaw with, for example, simultaneous rainfall, the risk of collapse increases in this case as well.

U.S. Pat. No. 5,850,185 discloses a method for monitoring the load which is exerted on a roof, comprising the following steps:
  providing a roof with an external surface on which a load can be exerted by, for example, a layer of water or snow,
  providing a sensor for detecting a phenomenon related to the load which is exerted on the roof.

Although this known method is able to provide an indication with respect to the relevant potential dangers, the risk that any warning may be too late still exists. The fact is that if the load which is exerted on the roof increases rapidly, there may be insufficient time to completely evacuate the relevant area or building. It is possible to achieve a longer period for evacuation by already providing the warning at a very early stage, which, however, has the drawback that many premature alarms will be raised, most of which will turn out to be false. With this known method, it is thus not possible to create a balance between, on the one hand, a reliable warning, and, on the other hand, a sufficiently long evacuation period.

Therefore, it is an object of the invention to provide a solution for these problems in connection with providing warnings concerning unexpectedly high loads on flat or virtually flat roofs. In particular, it is an object of the invention to achieve a significant reduction in the risk which such unforeseen loads form for the public inside the building concerned. This object is primarily achieved by means of a method for monitoring the load which is exerted on a roof, comprising the following steps:
  storing at least two predetermined different values for the phenomenon,
  emitting a signal when the sensor detects one of these values for the phenomenon,
  emitting a different signal when the sensor detects another one of these values for the phenomenon.

BRIEF SUMMARY OF THE INVENTION

With this method, a different approach is taken with respect to treating the problem in connection with unforeseen loads on a flat roof. It was customary to limit the amount of material, such as snow and water, but the method according to the invention is based on the view that it is not always possible to achieve such a limitation. This means that, despite all the measures to limit the load on the roof, there is still a residual risk which may cause great problems. In order to also exclude this risk, the invention provides for the load on the roof to be monitored in such a way that a timely warning to leave can be issued to the public if an overload is imminent.

In this connection, it is of great importance that any warning can be issued a considerable amount of time before the critical point in time. In order to avoid a panic, it is furthermore important to be able to issue a light warning initially, which does not immediately have to be connected with grave danger. For this reason, it is possible to provide a certain gradation in the signaling system, for example using a readout with different colours. In this connection, it is possible to use a series of colours symbolizing increasing danger levels, for example going from green, via shades of orange to red and the like. The signaling may consist of, for example, light sources of varying intensity and/or with different colours, such as green, orange and red. In addition, it is also possible for audible signals to be emitted.

In particular, the method according to the invention may to this end also comprise the following steps:
  storing at least several predetermined values of a monotonously changing magnitude or severity for the phenomenon,
  emitting signals associated with these predetermined values of a correspondingly monotonously changing intensity or emphasis when these respective values are exceeded.

By way of example, mention is made of emitting audio signals which become increasingly loud or light signals which become increasingly bright.

The predetermined values may change in steps, but also blend into one another continuously. It is also possible to monitor the phenomenon constantly or continuously over time. Alternatively, however, it is also possible to monitor the phenomenon intermittently, by carrying out the monitoring with intervals.

The method according to the invention may furthermore comprise the following steps:
  providing a detection signal source,
  emission of a detection signal by this detection signal source,
  detection of the detection signal by the sensor.

A detection signal of this type may be used in various ways. According to a first possibility, the following steps are provided:

affecting the detection signal in such a manner that this changes in a continuous manner when the phenomenon changes, emitting a warning signal on the basis of the continuous change in the detection signal.

Such a continuous change in the detection signal may, for example, be achieved by increasingly reducing the intensity of a light beam used as a detection signal, such as a diaphragm whose size is affected by the phenomenon.

However, according to an alternative the method according to the invention may comprise the following steps:

providing a constant detection signal, causing the position of the detection signal source and the sensor relative to one another to change when the phenomenon changes, emitting a warning signal on the basis of the change in the position of the detection signal source and the sensor relative to one another.

The phenomenon by means of which the method according to the invention can be carried out is preferably a movement of at least part of the roof. Such a movement is often to some extent proportional to the roof load, and thus to the danger of the roof collapsing. This movement may in this case be, in particular, a vertical movement, such as a sagging movement, of at least part of the roof.

The invention furthermore relates to a building, comprising a roof which may be subjected to a load, such as a layer of water and/or a layer of snow, as well as a device for detecting a phenomenon which is associated with this load. This device comprises a sensor, an evaluation unit to which the signals originating from the sensor are fed, as well as a signaling unit to which the signals originating from the evaluation unit are fed for emitting a signal on the basis of the phenomenon detected by the sensor. According to the invention, there is provision in such a building for at least two different predetermined values for the phenomenon to be stored in the evaluation unit. As has been described above, such a phenomenon may in particular be a movement, such as a sagging movement, of the roof. However, it is also possible to use other phenomena, such as bending movements, internal stresses, and the like to establish the load.

The sensor may be a light-sensitive sensor, such as an infrared sensor. In addition, a light source, a light-sensitive sensor receiving the light from the light source as well as an interrupter connected to the roof are provided. As soon as the interrupter, as a result of a sagging of the roof, comes to lie in the path of the light beam or light ray emitted by the light source, the sensor detects a partial or complete blocking of the light. On the basis of these data, the evaluation unit can then emit an associated alarm signal. In this case, the interrupter may be suitable to allow light to pass through in different intensities, depending on the movement of the roof.

By way of example, the variant is mentioned in which the light source and the light-sensitive sensor are connected to a wall of the building and the interrupter is connected to a part of the roof, such as a supporting girder. The light source and the light-sensitive sensor may also form a single entity in a known manner. In that case, there will be a mirror opposite the light source, which will reflect the light beam incident from the light source back to the sensor. In this case as well, the sensor will be able to emit a corresponding signal if the light beam is interrupted to a greater or lesser degree.

According to an alternative embodiment, the sensor may be of multiple design and comprise a series of sensor elements, each of which is associated with a predetermined value for the phenomenon. When changes occur in the phenomenon, a different sensor element is detected in each case, from which it is then possible to derive warning signals.

BRIEF DESCRIPTION OF THE DRAWINGS

The invention will be explained in more detail below with reference to an exemplary embodiment of a building provided with a security system according to the invention illustrated in the figures, in which.

DETAILED DESCRIPTION OF THE INVENTION

Figure 1:
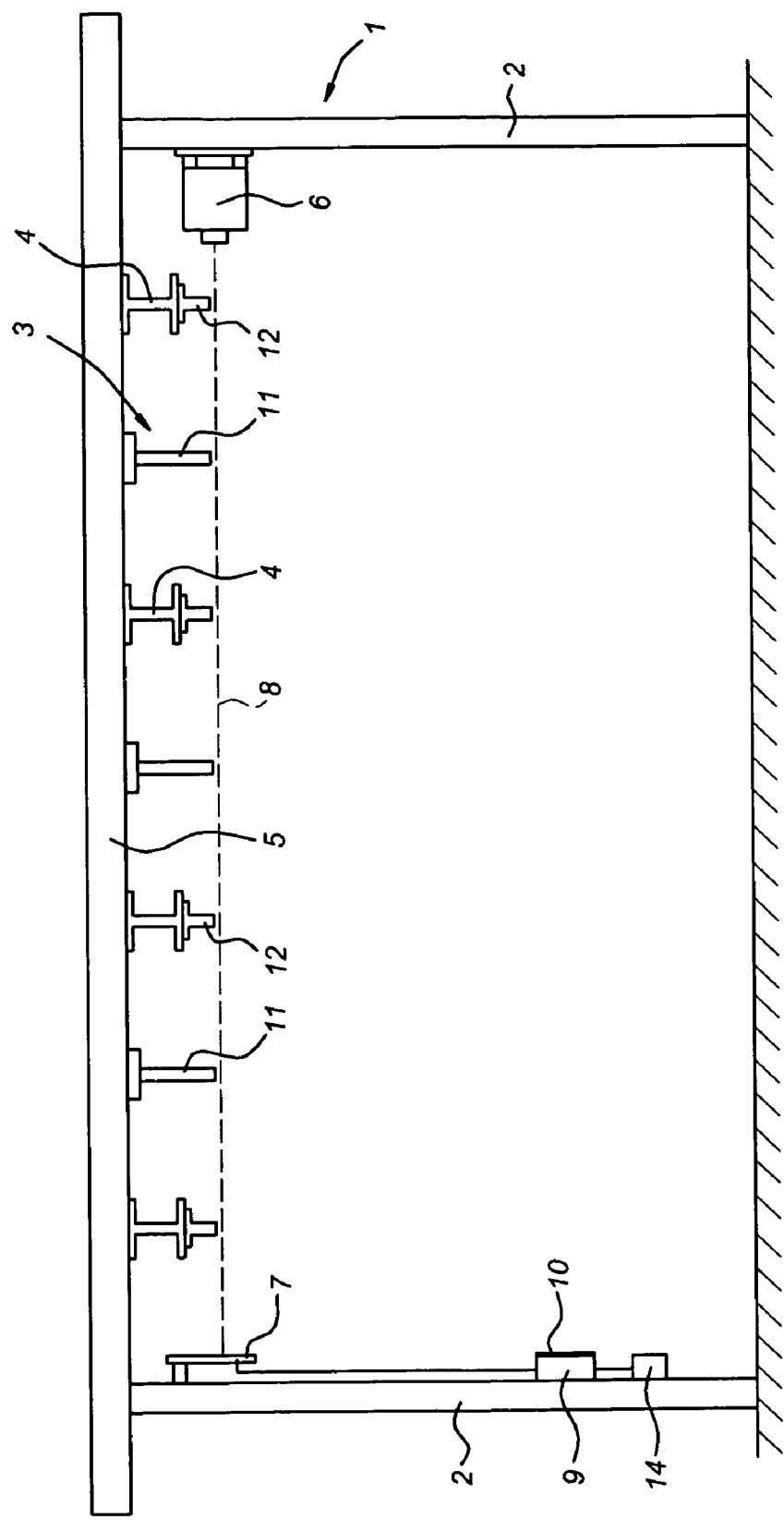
FIG. 1 shows a first embodiment of a building according to the invention.

The building 1 shown in FIG. 1 is provided with walls 2 and a flat roof 3. The flat roof 3, in a known manner, comprises a supporting steel structure with what are known as I-beams 4, which support the roof covering 5 spaced at regular intervals.

According to the invention, a light source, in particular a laser source 6, is provided on one of the walls 2, and a receiver 7 is provided on the opposite wall. The light beam emitted by the laser source 6 is diagrammatically indicated by reference numeral 8. As long as the roof 3 is in its normal position, that is to say that no excessive bending has occurred as a result of great loads, the light beam 8 which is emitted by the laser source 6 can freely reach the receiver 7. The receiver 7 transmits a corresponding signal to the evaluation unit 9, which shows that the situation is stable by means of the read-out unit 10.

Figure 2:
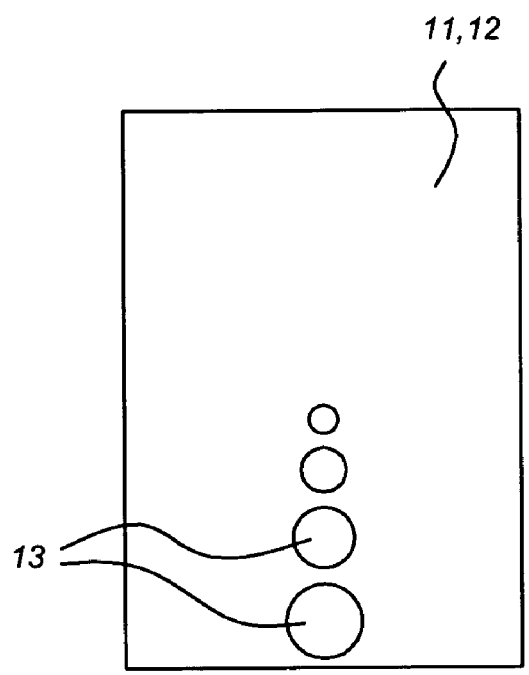
FIG. 2 shows a first embodiment of a registration interrupter of the building according to FIG. 1.

Registration interrupters 11 are arranged at regular intervals along the roof. Such registration interrupters 12 are also arranged on the I-beams 4. As soon as the roof 3 sags further than would normally be the case, one or more of these registration interrupters 11, 12 will come to lie in the path of the light beam 8. These registration interrupters 11, 12 may have the shape illustrated in FIGS. 2 and 3, viewed at right angles to the path of the light beam 8. In the variant of FIG. 2, registration interrupters 11, 12 are provided with a series of holes 13, the size of which decreases monotonously in the direction of the top. As soon as the registration interrupter enters the path of the light beam 8, a large amount of light will still be allowed to pass through, initially at the position of the bottom hole, which is relatively large. When the roof 4 sags further, the amount of light passing through decreases as a result of the increasingly small size of the holes lying closer to the top. This fluctuation in the light intensity received by the receiver 7 is registered by the evaluation unit 9, which is able to indicate the increasing level of danger. Ultimately, the evaluation unit 9 may emit a signal to the horn 14 in order to provide an audible alarm signal.

Figure 3:
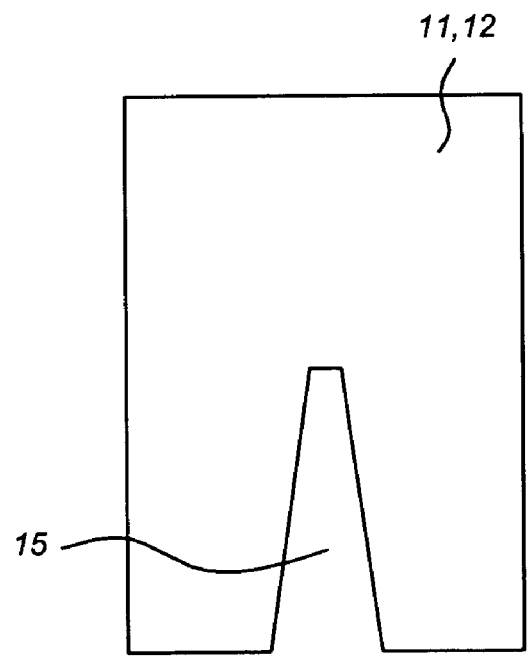
FIG. 3 shows a second embodiment of a registration interrupter.

In the variant of FIG. 3, an alternative embodiment of the registration interrupter 11, 12 is illustrated, having a slot 15 which narrows towards the top. In the case of such a slot, the amount of light received by the receiver 7 will also decrease gradually if the roof 3 sags further, which may result in the same reporting order as described above with reference to FIG. 2.

Figure 4:
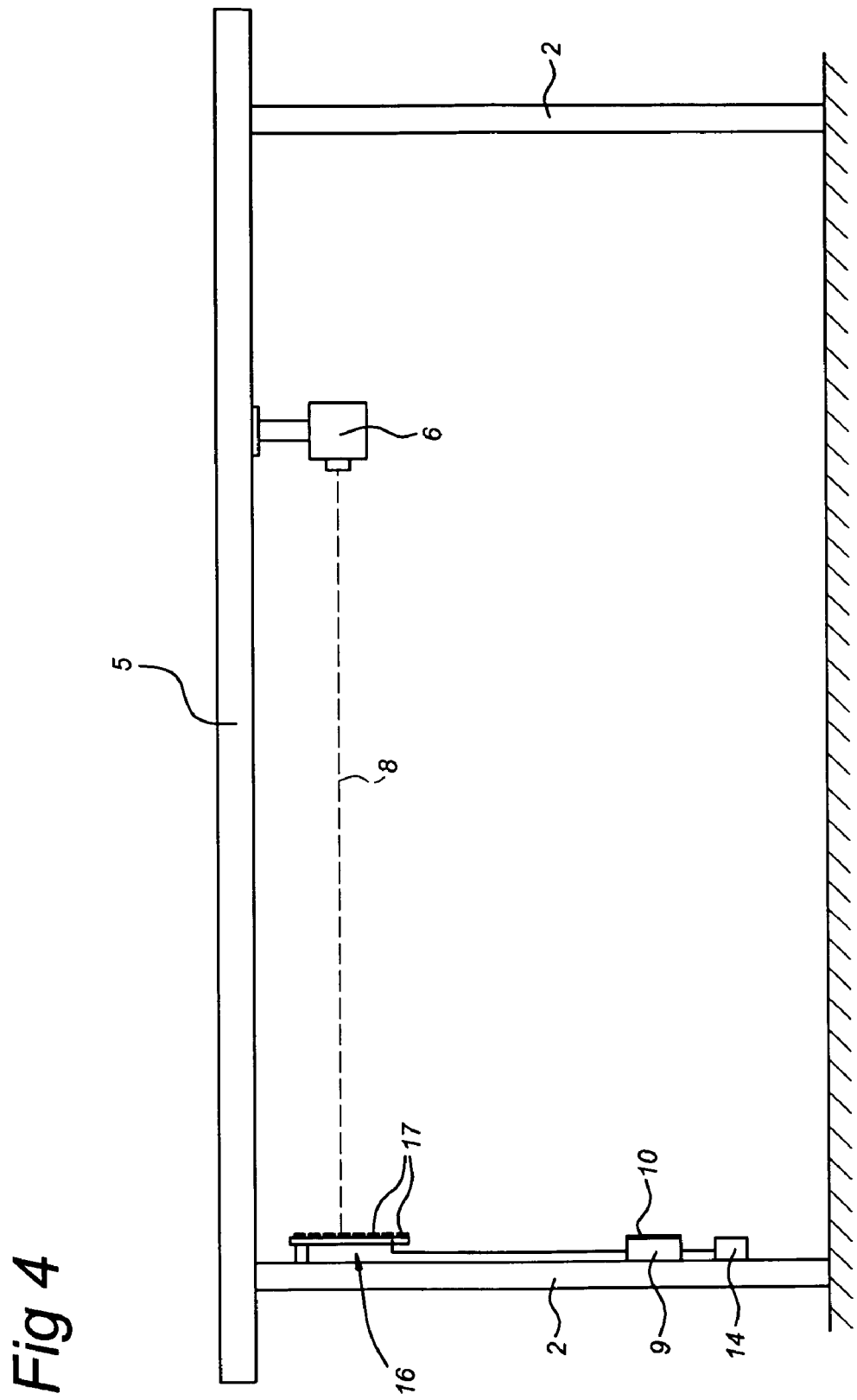
FIG. 4 shows a second embodiment of the building.

In general, the building illustrated in FIG. 4 is of similar construction and has a similar monitoring device. However, the sensor 16 is of multiple design and comprises a series of sensor parts 17 placed above one another. The light source, such as laser source 6, is now suspended from the roof 3. If this roof 3 sags, the direction of the laser beam 8 emitted by the laser source 6 will change. This means that the laser beam will be detected by different successive sensor elements 17 and on the basis of these transitions a warning may be generated as described above.

Figure 5:
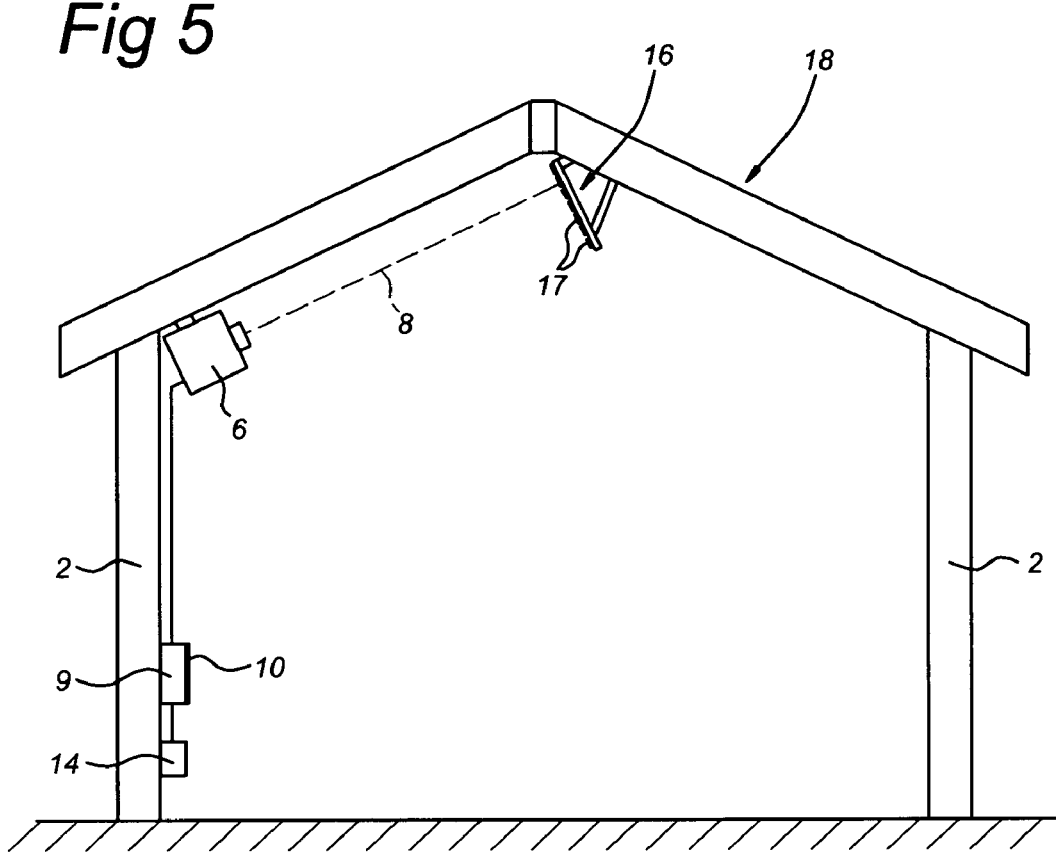
FIG. 5 shows a third embodiment of a building.

The building according to FIG. 5 has a gable roof construction 18. At a certain spot on this roof construction 18, the laser source is fitted opposite the multiple sensor 16. When the roof construction deforms, the laser beam is moved with respect to the sensor elements 17 in such a way that from a specific predetermined threshold value onwards, a warning may be generated.

The warning may be generated by an SMS service or via a conventional alarm centre.

Figure 6:
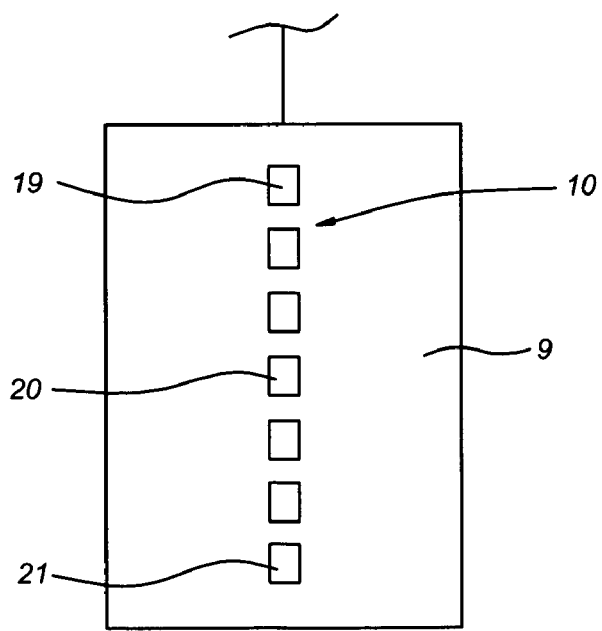
FIG. 6 shows a view of the read-out unit of the device according to the invention.

The read-out unit 10 illustrated in FIG. 6 in this example has seven windows, which light up depending on the load state of the roof. Under normal circumstances, when the roof is not overloaded, only the top window 19 lights up, for example in a green colour. When the load increases, the window underneath it lights up, and then the centre window 20. This centre window is, for example, orange in colour. As soon as this centre window 20 lights up, action may, for example, be taken to ask visitors to leave the area concerned.

If the load increases further, the next window underneath it will light up, and ultimately the bottom window 21, which is red in colour. If this window 21 lights up, there is an imminent danger of collapse. If desired, the alarm may be raised at a certain stage by means of, for example, a mobile telephone.

The invention claimed is:

1. A method for monitoring the load which is exerted on a roof (3) of a building (1), comprising the following steps:
   providing a roof (3; 18) with an external surface on which a load can be exerted,
   providing a sensor (7, 9; 16) for detecting a phenomenon related to the load which is exerted on the roof,
   storing at least two predetermined different values for the phenomenon (8),
   emitting a signal when said sensor (7, 9; 16) detects one of these values for the phenomenon, and
   emitting a different signal when said sensor (7, 9; 16) detects another one of these values for the phenomenon (8).

2. The method according to claim 1, comprising she following steps:
   storing at least three predetermined values of a monotonously changing magnitude for the phenomenon, and
   emitting signals associated with the at least three predetermined values of a correspondingly monotonously changing magnitude when these respective values are detected.

3. The method according to claim 2, wherein the emitting signers stop includes emitting signals associated with the at least three predetermined values of a correspondingly monotonously changing intensity.

4. The method according to claim 1, comprising the following steps:
   storing a series of predetermined values with a stepwise change in the magnitude for the phenomenon,
   emitting at least one signal when one of these predetermined values changes to another predetermined value in a stepwise manner.

5. The method according to claim 1, comprising the step of intermittently monitoring the phenomenon.

6. The method according to claim 1, comprising the following steps:
   providing a detection signal source (6),
   emitting a detection signal (8) by this detection signal source (6), and
   detecting the detection signal (8) by the sensor (7, 9; 16).

7. The method according to claim 6, comprising the following steps:
   affecting the detection signal (8) in such a manner that this changes in a continuous manner when the phenomenon changes,
   emitting a warning signal on the basis of the continuous change in the detection signal (8).

8. Method according to claim 6, comprising the following steps:
   providing a constant said detection signal (8),
   causing the position of the detection signal source (6) and she sensor (16) relative to one another to change when toe phenomenon changes, emitting a warning signal on the basis of the change in the position of the detection signal source (6) and the sensor (16) relative to one another.

9. The method according to claim 1, comprising the step of emitting at least one of an audible and visual signal.

10. The method according to claim 1, in which the phenomenon is related to a movement off at least part of the roof (3).

11. The method according to claim 1, in which the phenomenon is related to a vertical movement of at least part of the roof (3).

12. The method according to claim 11, wherein the phenomenon is related to a sagging movement of at least part of the roof (3).

13. A building (1), comprising:
   a roof (3) subjected to a load
   a device (6, 7, 9; 16, 10, 14) constructed and arranged to detect a phenomenon which is associated with this load, said device comprising:
   a sensor (7, 9; 16);
   an evaluation unit (9) to which the signals originating from the sensor (7) are fed; and
   a signalling unit (10, 14) to signal on the basis of the phenomenon detected by the sensor (7; 16),
   wherein at least two different predetermined values for the phenomenon are stored in the evaluation unit and wherein said different predetermined values are associated with at least a single said sensor.

14. The building (1) according to claim 13, in which the sensor is a light-sensitive sensor.

15. The building (1) according to claim 14, wherein the sensor is an infrared sensor.

16. The building (1) according to claim 13, in which a light source (6), a light-sensitive sensor (7, 9; 16) receiving the light from the light source (6) as well as an interrupter (11, 12) connected to the roof (3) are provided.

17. The building (1) according to claim 16, in which the interrupter (11, 12) is designed to allow light to pass through in different intensities, depending on the movement or the roof (3).

18. The building (1) according to claim 13, wherein the sensor (16) further comprises:

a series of sensor elements (17), each said sensor element (17) being associated with a predetermined value for the phenomenon.

19. The building (1) according to claim 13, in which the light source (6) and the light-sensitive sensor (7, 9) are connected to a wall (2) of the building (1), and an interrupter (11, 12) is connected to a part of the roof (3).

20. The building (1) according to claim 19, wherein the interrupter (11, 12) is connected to a supporting girder (4).

21. The building according to claim 13, comprising a gable rout construction (18), in which the light source (6) and/or the light-sensitive sensor (7, 9; 16) are connected to a part of the roof construction (18).

22. The building according to claim 21, wherein at least of the light source (6) and the light-sensitive sensor (7, 9; 16) are connected to a roof truss.

* * * * *